United States Patent
Andres et al.

(10) Patent No.: US 12,473,969 B2
(45) Date of Patent: *Nov. 18, 2025

(54) METHODS AND SYSTEMS FOR A GEAR BOX WITH MULTIPLE RATIOS

(71) Applicant: Dana Automotive Systems Group, LLC, Maumee, OH (US)

(72) Inventors: Gregory R. Andres, Blissfield, MI (US); Mitchell R. Lawson, Perrysburg, OH (US); Marcelo Nakandakari, Perrysburg, OH (US); Andrew C. Shupe, Waterville, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/298,947

(22) Filed: Apr. 11, 2023

(65) Prior Publication Data

US 2023/0243415 A1 Aug. 3, 2023

Related U.S. Application Data

(63) Continuation of application No. 16/989,643, filed on Aug. 10, 2020, now Pat. No. 11,674,590.

(51) Int. Cl.
```
F16H 57/04      (2010.01)
B60K 1/00       (2006.01)
B60K 17/06      (2006.01)
F16H 3/091      (2006.01)
F16H 37/04      (2006.01)
```

(52) U.S. Cl.
CPC ........... *F16H 57/0423* (2013.01); *B60K 1/00* (2013.01); *B60K 17/06* (2013.01); *F16H 3/091* (2013.01); *F16H 57/0428* (2013.01); *B60K 2001/001* (2013.01); *F16H 37/04* (2013.01); *F16H 2200/0021* (2013.01); *F16H 2200/0039* (2013.01)

(58) Field of Classification Search
CPC .. F16H 57/0423; F16H 3/091; F16H 57/0428; F16H 37/04; B60K 1/00; B60K 17/06; B60K 2001/00; B60K 2001/001
USPC .............. 192/219.5; 475/221, 343; 74/665 G
See application file for complete search history.

(56) References Cited

U.S. PATENT DOCUMENTS

| | | | |
|---|---|---|---|
| 4,242,923 A | | 1/1981 | Nishikawa et al. |
| 4,420,990 A | * | 12/1983 | Hauser ................ F16H 57/0406 184/6.12 |

(Continued)

FOREIGN PATENT DOCUMENTS

| | | |
|---|---|---|
| CN | 106678293 A | 5/2017 |
| WO | 8201232 A1 | 4/1982 |

(Continued)

*Primary Examiner* — Edwin A Young
(74) *Attorney, Agent, or Firm* — McCoy Russell LLP

(57) ABSTRACT

Systems for an electric drive axle of a vehicle are provided. In one example, an electric drive axle system includes a gear box including a plurality of gear ratios. The plurality of gear ratios includes a fixed center distance measured from a carrier to an axle on which a plurality of gears or a plurality of pinions is arranged. Each pinion of the plurality of pinions is differently sized, wherein all pinions except for a largest pinion include a pinion baffle. Each gear of the plurality of gears is differently sized, wherein all gears except for a largest gear include a gear baffle.

18 Claims, 5 Drawing Sheets

(56) References Cited

U.S. PATENT DOCUMENTS

| | | | |
|---|---|---|---|
| 5,092,196 A * | 3/1992 | Kameda | F16H 57/0447 184/6.12 |
| 5,358,457 A | 10/1994 | Braun | |
| 7,421,921 B2 * | 9/2008 | Kimura | F16H 57/043 184/6.12 |
| 8,747,265 B2 * | 6/2014 | Onomura | F16H 3/126 475/5 |
| 10,274,072 B2 | 4/2019 | Pitcavage | |
| 10,781,909 B2 * | 9/2020 | Graves | F16H 57/0423 |
| 11,365,798 B1 * | 6/2022 | Rejman | F16H 57/02 |
| 11,674,590 B2 * | 6/2023 | Andres | B60K 17/06 180/65.6 |
| 11,994,205 B1 * | 5/2024 | Powell | F16H 57/0423 |
| 12,104,690 B2 * | 10/2024 | Walters | F16H 57/043 |
| 2006/0179973 A1 * | 8/2006 | Matsufuji | F16H 57/0447 74/606 R |
| 2007/0251348 A1 * | 11/2007 | Hayes | F16H 57/0434 74/606 R |
| 2009/0314560 A1 | 12/2009 | Oba et al. | |
| 2017/0030457 A1 * | 2/2017 | Hotait | F16H 57/0463 |
| 2017/0102064 A1 * | 4/2017 | Preston | F16H 57/0483 |
| 2017/0146112 A1 | 5/2017 | Anglin et al. | |
| 2017/0284534 A1 | 10/2017 | Anglin | |
| 2018/0187770 A1 | 7/2018 | Anglin et al. | |
| 2019/0170242 A1 | 6/2019 | Nishida et al. | |
| 2019/0257406 A1 * | 8/2019 | Ichikawa | F16H 57/0452 |
| 2024/0247711 A1 * | 7/2024 | Nagata | F16H 37/0813 |

FOREIGN PATENT DOCUMENTS

| | | | |
|---|---|---|---|
| WO | 2014099087 A2 | 6/2014 | |
| WO | 2015031185 A1 | 3/2015 | |

* cited by examiner

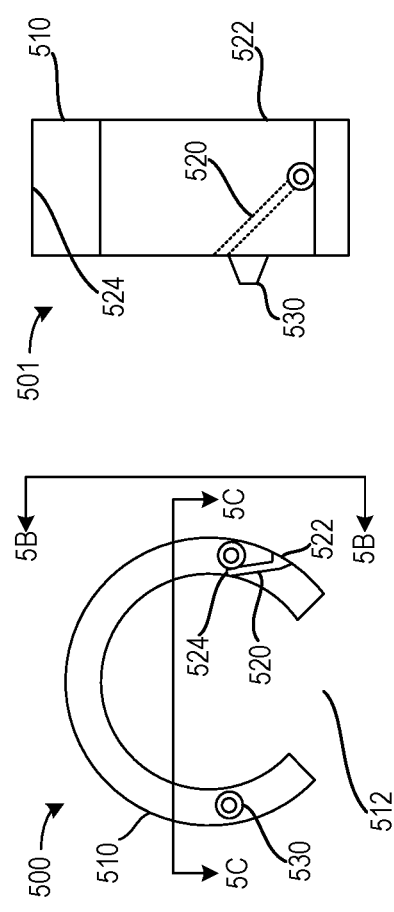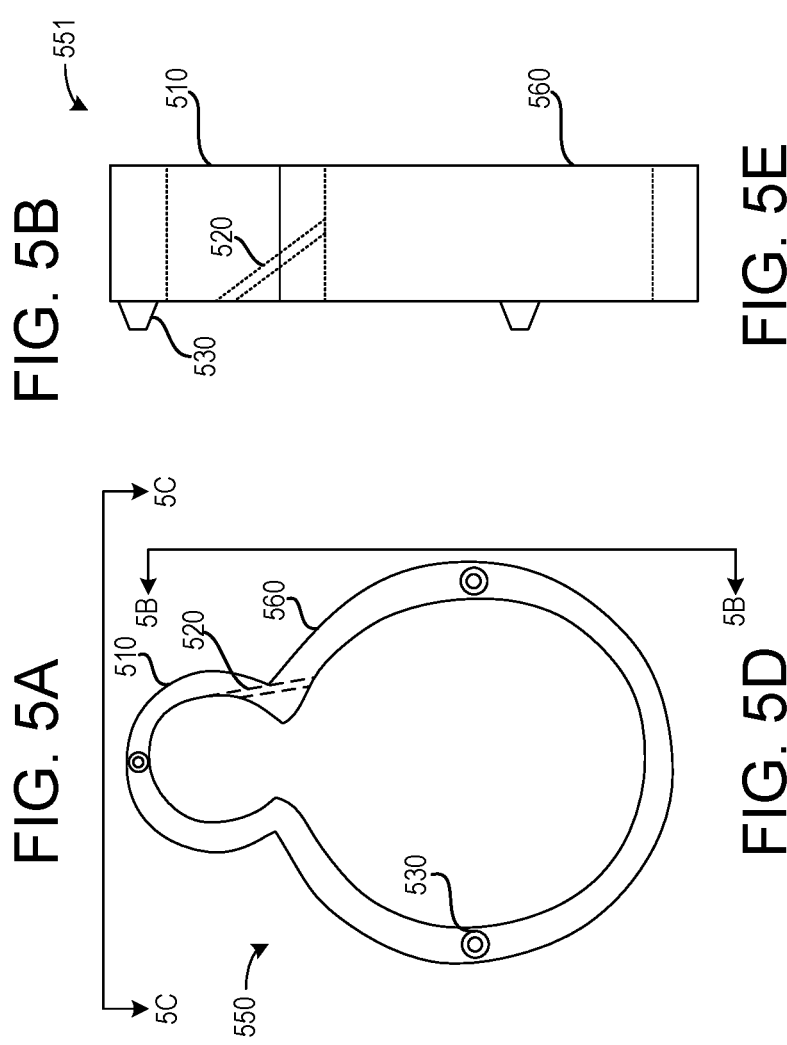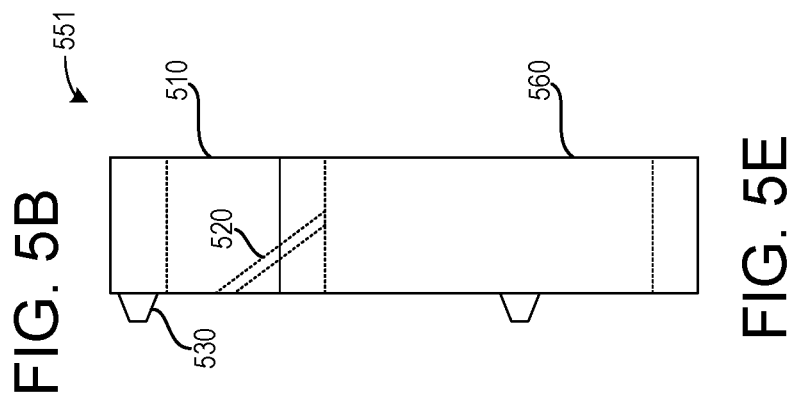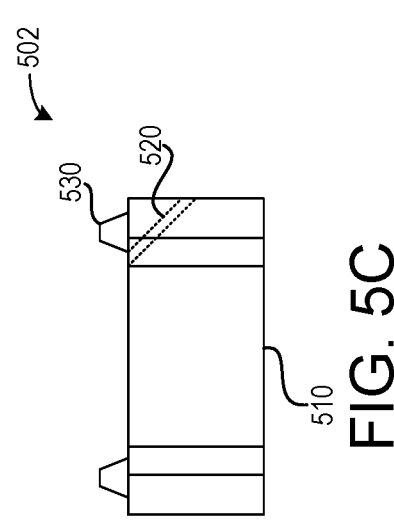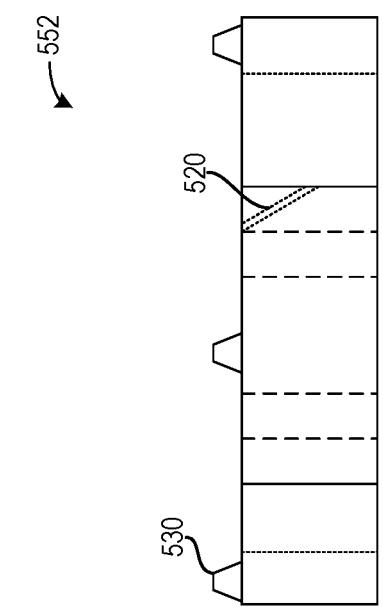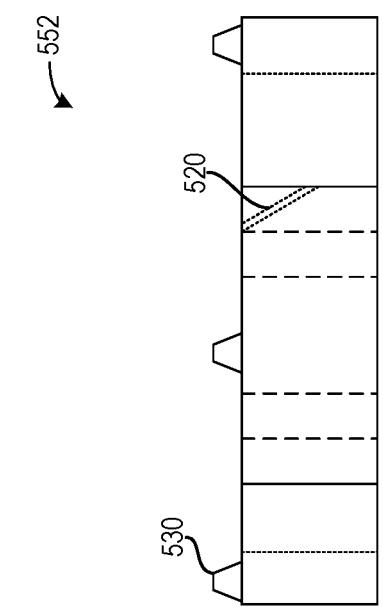

METHODS AND SYSTEMS FOR A GEAR BOX WITH MULTIPLE RATIOS

CROSS REFERENCE TO RELATED APPLICATION

The present application is a continuation of U.S. Non-Provisional patent application Ser. No. 16/989,643, entitled "METHODS AND SYSTEMS FOR A GEAR BOX WITH MULTIPLE RATIOS", and filed on Aug. 10, 2020. The entire contents of the above-listed application are hereby incorporated by reference for all purposes.

TECHNICAL FIELD

The present description relates to electric drive axles in vehicles, and more particularly to a multiple ratio gear box with a fixed size carrier.

BACKGROUND

Electrified axles have been incorporated into electric as well as hybrid electric vehicles to provide or augment vehicle propulsion. The electrified axles have included gearboxes acting to provide a desired gear ratio for rotational energy transfer between the electric motor and the drive wheels. However, the inventors have recognized that previous electric drive axles have exhibited drawbacks related to axle packaging and gearbox access. The gearbox access issues may present impediments to an end-user's ability to alter the drive ratio (e.g., the final drive ratio) of the vehicle. In conventional rear axles, hypoid gear sets coupled to differentials have been used as final stage gears. However, gear sets in parallel axis gear arrangements pose additional lubrication challenges in comparison to hypoid gear arrangements along with packaging difficulties. Previous examples for gear boxes comprising multiple gears with different ratios include sizing a carrier based on a largest pinion and gear. However, this creates empty, unused space around smaller pinions and/or smaller gears which may be filled via a combination of air and lubricant. This excess lubricant may increase churning losses and lower efficiency.

SUMMARY

To overcome at least some of the aforementioned drawbacks, an electric drive axle system is provided. A gear box of the electric drive axle system comprises a plurality of gear ratios comprising a fixed center distance measured from a carrier to an axle on which a plurality of gears or a plurality of pinions is arranged, wherein each pinion of the plurality of pinions is differently sized, and wherein all pinions except for a largest pinion comprise a baffle.

In one example, a gear box comprises multiple ratios via a plurality of pinions and a plurality of gears. A pinion carrier is sized based on a largest pinion and a gear carrier is sized based on a largest gear. The gear box further comprises a plurality of baffles sized based on each pinion and gear, wherein the plurality of pinions comprises the largest pinion, a middle pinion, and a smallest pinion, and the plurality of gears comprises the largest gear, a middle gear, and a smallest gear. The plurality of baffles is sized and shaped such that a combination of a pinion smaller than the largest pinion and its corresponding baffle comprises a combined area equal to the largest pinion. Similarly, a combination of a gear smaller than the largest gear and its corresponding baffle comprises a combined area equal to an area of the largest gear.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 5A, 5B and 5C show various views of an example gear baffle.

FIGS. 5D, 5E, and 5F show various views of the gear baffle integrally formed with a pinion baffle.

DETAILED DESCRIPTION

An electric drive axle system with a plurality of differently shaped baffles customized to various sizes of pinions and gears is described herein. A gear box comprising multiple gear ratios further comprises a single sized carrier for each gear ratio of the plurality of gear ratios. The single sized carrier is sized based on a largest gear and a largest pinion. The plurality of differently shaped baffles is sized to fit each of the differently sized pinions and gears to reduce an amount of space between the pinion or gear and the carrier to decrease churning losses and increase efficiency.

The gear box of the electric drive axle of the present disclosure comprises a first gear ratio, a second gear ratio, and a third gear ratio; however, the gear box may have any number of ratios. The gear ratios are illustrated in a single plane, however, the actual gear box may have an angle between the plane of the first gear ratio and the plane of the second gear ratio and so on.

The present disclosure illustrates the gears as a simple spur or helical gear set. However, the gear box may use other cylindrical gears such as planetary, Ravigneaux, etc. or other bevel gears such as straight bevel, spiral bevel, hypoid, etc.

Figure 1:
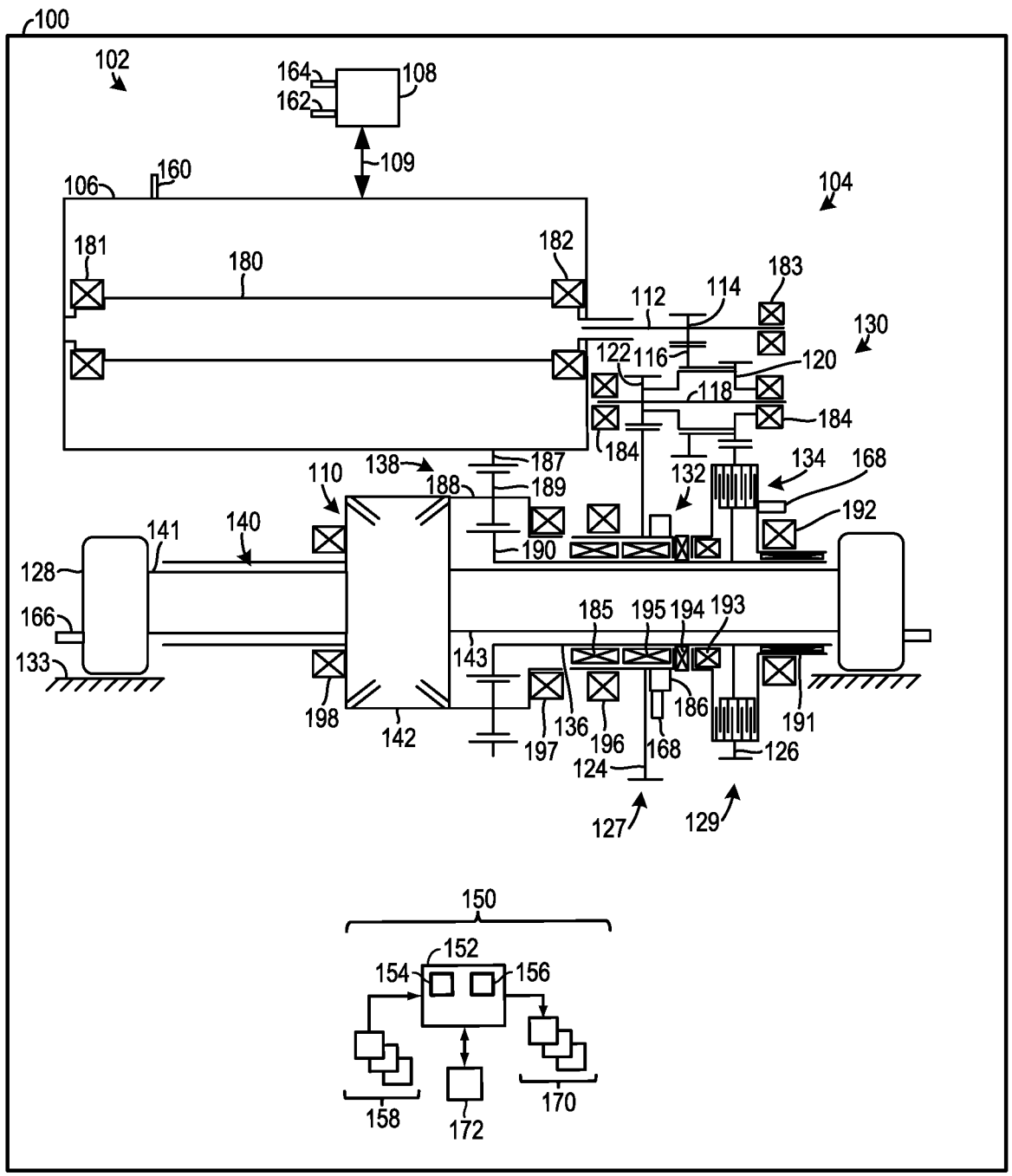
FIG. 1 is a schematic representation of a vehicle including an electric drive axle system.
Figure 2:
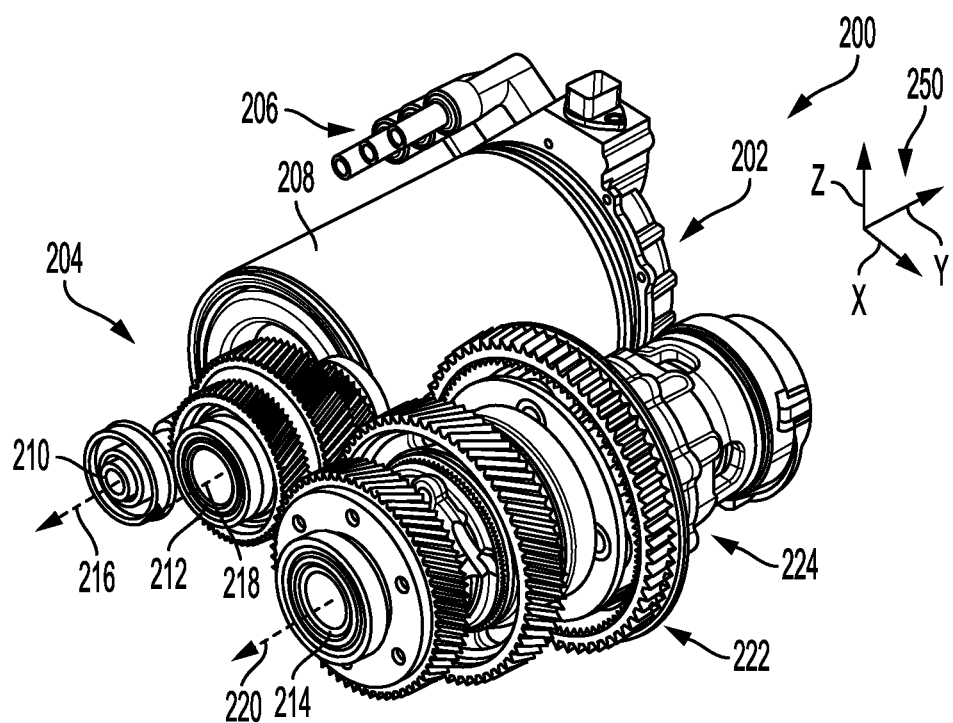
FIG. 2 shows a perspective view of an example of an electric drive axle system with a gear train having multiple selectable gear sets.
Figure 3:
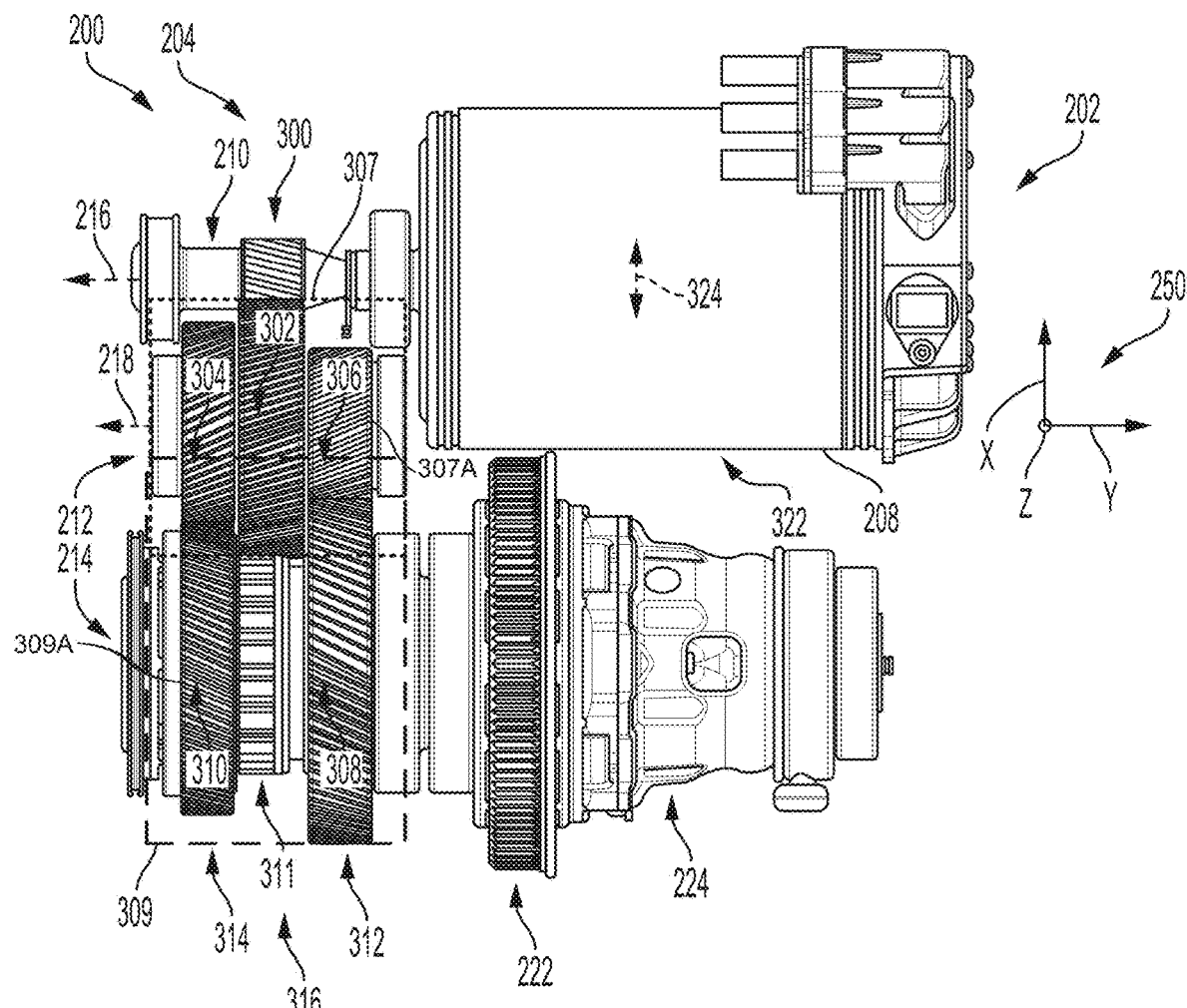
FIG. 3 shows a top view of the electric drive axle system depicted in FIG. 2.
Figure 4:
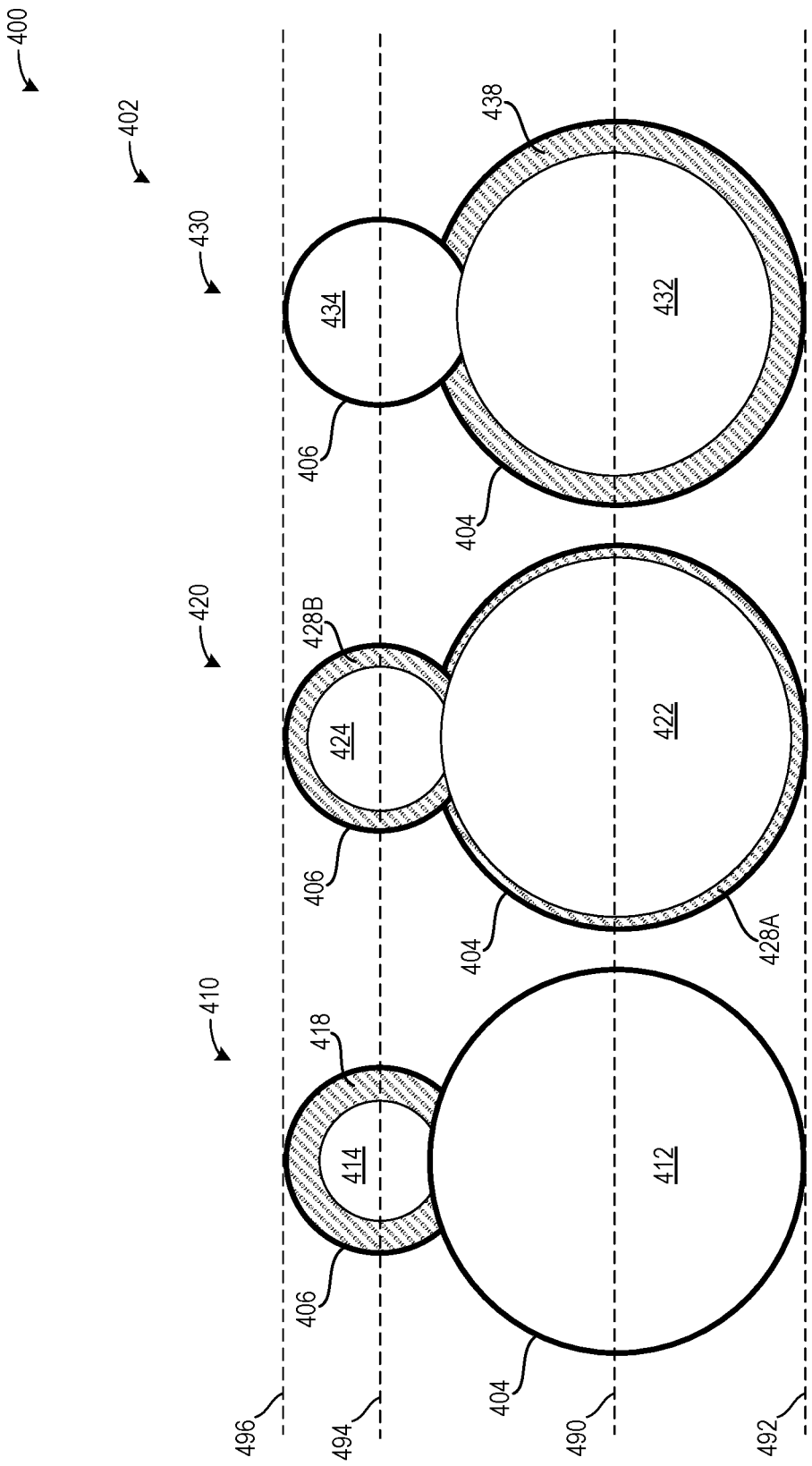
FIG. 4 shows an embodiment of a multiple ratio gear box.

FIG. 1 schematically illustrates a vehicle with an electric drive axle system designed with multiple gear ratios. FIGS. 2-3 illustrate different views of an example of an electric drive axle system. FIG. 4 illustrates an example of a gear box comprising a plurality of gear ratios with a plurality of differently sized baffles arranged therein. FIGS. 5A, 5B, 5C illustrate an example gear baffle. FIGS. 5D, 5E, and 5F illustrate an example of a pinion baffle integrally formed with the gear baffle.

FIG. 1 shows a schematic depiction of a vehicle 100 having an electric drive axle system 102 with a gear train 104 and an electric motor-generator 106. The stick diagram of FIG. 1 provides a high-level topology of the vehicle, gear train, and corresponding components. However, it will be understood that the vehicle, gear train, and corresponding components have greater structural complexity than is captured in FIG. 1. The structural details of various facets of the gear train 104 are illustrated, by way of example, in greater detail herein with regard to FIGS. 2-4.

The electric motor-generator 106 is electrically coupled to an energy storage device 108 (e.g., battery, capacitor, and the like). Arrows 109 signify the energy transfer between the electric motor-generator 106 and the energy storage device 108 that may occur during different modes of system operation. The electric motor-generator 106 may include conventional components for generating rotational output (e.g., forward and reverse drive rotational output) and/or electrical energy for recharging the energy storage device 108 such as a rotor electromagnetically interacting with a stator, to provide the aforementioned energy transfer functionality. The electric motor-generator 106 is shown including a rotor shaft 180 with a first bearing 181 and a second bearing 182 coupled thereto. The first bearing 181 may be a fixed bearing and the second bearing 182 may be a floating bearing. Although the second bearing 182 is shown positioned within the motor-generator, it will be understood that in some embodiments, bearing 182 may be coupled to the input shaft to facilitate rotation therefore. Other bearing arrangements with regard to the motor-generator have been contemplated such as arrangements with alternate quantities and/or types of bearings.

The vehicle may take a variety of forms in different embodiments. For example, the vehicle 100 may be a hybrid vehicle where both the electric motor-generator 106 and an internal combustion engine (not shown) are utilized for motive power generation. For instance, in one use-case hybrid vehicle configuration, the internal combustion engine may assist in recharging the energy storage device 108, during certain conditions. In another use-case hybrid vehicle configuration, the internal combustion engine may be configured to provide rotational energy to a differential 110 or other suitable locations in the gear train 104. In yet another use-case hybrid vehicle configuration, the engine may provide rotational input to another drive axle (not shown). Further, in other examples, the vehicle may be a battery electric vehicle (BEV) where the internal combustion engine is omitted.

The rotor shaft 180 of the electric motor-generator 106 is coupled to an input shaft 112. For instance, the rotor shaft 180 may be transition fit, slip fit, mechanically attached, in splined engagement, combinations thereof, etc., with an end of the input shaft 112. A first gear 114 is positioned or formed on the input shaft 112. A bearing 183 is shown coupled to the input shaft 112. The bearing 183 may be a fixed bearing, in one example. However, in other examples, the bearing 183 may be another suitable type of bearing or in some cases may be omitted from the system.

A second gear 116 is rotationally coupled to the first gear 114 and resides on an intermediate shaft 118. As described herein, rotational coupling between gears or other components may include an interface between the gears where teeth of the gears mesh to facilitate rotational energy transfer therebetween. As such, rotational coupling of the components allows rotational energy transfer to be transferred between the corresponding components. Conversely, rotational decoupling may include a state between two components when rotational energy is substantially inhibited from being transferred between the components.

A third gear 120 and a fourth gear 122 are additionally included on the intermediate shaft 118, although other gearing arrangements have been envisioned. Bearings 184 (e.g., tapered roller bearings) are coupled to either axial end of the intermediate shaft 118 to support the shaft and facilitate rotation thereof. The tapered roller bearings may decrease the axle package width when compared to other types of bearing such as ball bearings. However, other suitable intermediate shaft bearing types and/or arrangements have been envisioned. The bearing arrangement on the intermediate shaft as well as the other bearing arrangements described herein may be selected based on expected shaft loading (e.g., radial and thrust loading), gear size, shaft size, etc.

Continuing with the gear train description, the fourth gear 122 is rotationally coupled to a fifth gear 124 and the third gear 120 is rotationally coupled to a sixth gear 126. The first gear 114, the second gear 116, the third gear 120, the fourth gear 122, the fifth gear 124, and the sixth gear 126 are included in a gear assembly 130, in the illustrated embodiment. However, the gear assembly may include an alternate number of gears and/or have a different layout, in other embodiments. The number of gears in the assembly and the assembly layout may be selected based on end-use design goals related to desired gear range and packaging, for instance.

The first gear 114, the second gear 116, the fourth gear 122, and the fifth gear 124, may be included in a first gear set 127. Additionally, the first gear 114, the second gear 116, third gear 120, and the sixth gear 126, may be included in a second gear set 129. The first gear set 127 may have a higher gear ratio than the second gear set 129, in one example. However, other gear arrangements in the different gear sets may be used, in other examples. Clutch assemblies in the system 102 allow the first gear set 127 or the second gear set 129 to be placed in an operational state. To elaborate, the clutch assemblies allow the gear ratio delivered to drive wheels 128 on driving surfaces 133, by way of the gear assembly 130, a planetary gear assembly 138, and the differential 110, to be adjusted. For instance, the clutch assemblies may be operated to engage the first gear set 127, during certain conditions (e.g., towing, lower speed vehicle operation, etc.), and engage the second gear set 129, during other conditions (e.g., higher speed vehicle operation). As such, the system may transition between the different gear sets based on vehicle operating conditions, driver input, etc. In this way, the gear train has distinct selectable gear ratios, allowing the gear train to be adapted for different driving conditions, as desired. It will be appreciated that the gear ratio adjustability may also be utilized to increase electric motor efficiency, in some cases.

The system 102 may specifically include a first clutch assembly 132 and a second clutch assembly 134. The first clutch assembly 132 is configured to rotationally couple and decouple the fifth gear 124 from an output shaft 136. Likewise, the second clutch assembly 134 functions to rotationally couple and decouple the sixth gear 126 from the output shaft 136. The first clutch assembly 132 may include a one-way clutch 185 (e.g., sprag clutch) and a locking clutch 186 working in conjunction to accomplish the coupling/decoupling functionality, in a compact arrangement. However, other clutch designs have been contemplated, such as a friction clutch (e.g., wet friction clutch), a hydraulic clutch, an electromagnetic clutch, a synchronizer, and the like. The structure and function of the one-way and locking clutches are described in greater detail herein. The second clutch assembly 134 may be a wet friction clutch providing smooth engagement/disengagement, in one embodiment. However, in other examples, the second clutch assembly 134 may include additional or alternate types of suitable clutches (e.g., hydraulic, electromagnetic, etc.).

The output shaft 136 is rotationally coupled to the planetary gear assembly 138, in the illustrated embodiment. The planetary gear assembly 138 may include an annulus 187 also referred to as a ring gear, a carrier 188 with planet gears 189 mounted thereon, and a sun gear 190 providing a space efficient design capable of providing a relatively high gear ratio in comparison to non-planetary arrangements. In the illustrated embodiment, the sun gear 190 is rotationally coupled to the output shaft 136 and the carrier 188 is rotationally coupled to the differential 110 (e.g., a differential case). However, in alternate examples, different gears in the planetary assembly may be rotationally coupled to the output shaft and the differential. Further, in one example, the components of the planetary gear assembly 138 may be non-adjustable with regard to the components that are held stationary and allowed to rotate. Thus, in one-use case example, the annulus 187 may be held substantially stationary and the carrier 188, planet gears 189, and the sun gear 190 and the gears' stationary/rotational state may remain unchanged during gear train operation. In the illustrated embodiment, the annulus 187 is fixedly coupled to the motor-generator housing, to increase system space efficiency. However, the annulus may be fixedly coupled to other vehicle structures, in other instances. By using a non-adjustable planetary assembly, gear train operation may be simplified when compared to planetary arrangements with gears having rotational state adjustability. However, adjustable planetary arrangements may be used in the system, in other embodiments.

Various bearings may be coupled to the output shaft 136 and the planetary gear assembly 138 to enable rotation of components coupled to the shaft and assembly and in some cases support the components with regard to radial and/or thrust loads. A bearing 191 (e.g., needle roller bearing) is shown coupled to the output shaft 136 and the second clutch assembly 134. Additionally, a bearing 192 (e.g., tapered roller bearing) is shown coupled to the second clutch assembly 134. A bearing 193 (e.g., floating bearing) is also shown coupled to the second clutch assembly 134 and the output shaft 136. A bearing 194 (e.g., thrust bearing) may also be positioned axially between and coupled to the sixth gear 126 and the first clutch assembly 132. A bearing 196 (e.g., fixed bearing) may also be coupled to the one-way clutch 185. Additionally, a bearing 197 (e.g., ball bearing) is shown coupled to the planetary gear assembly 138 and a bearing 198 (e.g., ball bearing) is shown coupled to the differential case 142. However, other suitable bearing arrangements have been contemplated, such as arrangements where the quantity and/or configurations of the bearings are varied.

Additionally, FIG. 1 depicts the planetary gear assembly 138 directly rotationally coupled to the differential 110. Directly coupling the planetary gear assembly to the differential increases system compactness and simplifies system architecture. In other examples, however, intermediate gearing may be provided between the planetary gear assembly and the differential. In turn, the differential 110 is designed to rotationally drive an axle 140 coupled to the drive wheels 128. The axle 140 is shown including a first shaft section 141 and a second shaft section 143 coupled to different drive wheels 128. Furthermore, the axle 140 is shown arranged within (e.g., co-axial with) the output shaft 136 which allows more space efficient design to be achieved. However, offset axle-output shaft arrangements may be used, in other examples.

Further in one example, the axle 140 may be a beam axle. A beam axle, also referred to in the art as a solid axle or rigid axle, may be an axle with mechanical components structurally supporting one another and extending between drive wheels coupled to the axle. Thus, wheels coupled to the axle may move in unison when articulating, during, for example, vehicle travel on uneven road surfaces. For instance, the beam axle may be a structurally continuous axle spanning the drive wheels on a lateral axis, in one embodiment. In another embodiment, the beam axle may include co-axial shafts receiving rotational input from different gears in the differential and structurally supported by the differential.

The differential 110 may include a case 142 housing gearing such as pinion gears, side gears, etc., to achieve the aforementioned energy transfer functionality. To elaborate, the differential 110 may be an electronic locking differential, in one example. In another example, the differential 110 may be an electronic limited slip differential or a torque vectoring dual clutch. In yet other examples, an open differential may be used. Referring to the locking differential example, when unlocked, the locking differential may allow the two drive wheels to spin at different speeds and conversely, when locked, the locking differential may force the drive wheels to rotate at the same speed. In this way, the gear train configuration can be adapted to increase traction, under certain driving conditions. In the case of the limited slip differential, the differential allows the deviation of the speed between sections of the shaft coupled to the drive wheels 128 to be constrained. Consequently, traction under certain road conditions (e.g., low traction conditions such as icy conditions, wet conditions, muddy conditions, etc.) may be increased due to the wheel speed deviation constraint. Additionally, in the torque vectoring dual clutch example, the differential may allow for torque delivered to the drive wheels to be independently and more granularly adjusted to again increase traction during certain driving conditions. The torque vectoring dual clutch may therefore provide greater wheel speed/torque control but may, in some cases, be more complex than the locking or limited slip differentials.

The vehicle 100 may also include a control system 150 with a controller 152. The controller 152 includes a processor 154 and memory 156. The memory 156 may hold instructions stored therein that when executed by the processor cause the controller 152 to perform the various methods, control techniques, etc., described herein. The processor 154 may include a microprocessor unit and/or other types of circuits. The memory 156 may include known data storage mediums such as random-access memory, read-only memory, keep alive memory, combinations thereof, etc. Furthermore, it will also be understood that the memory 156 may include non-transitory memory.

The controller 152 may receive various signals from sensors 158 coupled various locations in the vehicle 100 and the electric drive axle system 102. The sensors may include a motor-generator speed sensor 160, an energy storage device temperature sensor 162, an energy storage device state of charge sensor 164, wheel speed sensors 166, clutch position sensors 168, etc. The controller 152 may also send control signals to various actuators 170 coupled at different locations in the vehicle 100 and the electric drive axle system 102. For instance, the controller 152 may send signals to the electric motor-generator 106 and the energy storage device 108 to adjust the rotational speed and/or direction (e.g., forward drive rotational direction and reverse drive rotational direction) of the motor-generator. The controller 152 may also send signals to the first clutch assembly 132 and the second clutch assembly 134 to adjust the operational gear ratio in the gear train 104. For instance, the first clutch assembly 132 may be disengaged and the second clutch assembly 134 may be engaged to place the second gear set 129 in an operational state (transferring rotational energy between the electric motor-generator 106 and the output shaft 136). The other controllable components in the vehicle and gear system may function in a similar manner with regard to command signals and actuator adjustment. For instance, the differential 110 may receive command signals from the controller 152.

The vehicle 100 may also include an input device 172 (e.g., a gear selector such as a gear stick, gear lever, etc., console instrument panel, touch interface, touch panel, keyboard, combinations thereof, etc.) The input device 172, responsive to driver input, may generate a mode request indicating a desired operating mode for the gear train. For instance, in a use-case example, the driver may shift a gear selector into a gear mode (e.g., first gear mode or second gear mode) to generate a gear set modal transition request at the controller. In response, the controller commands gear train components (e.g., the first clutch assembly 132 and the second clutch assembly 134) to initiate a transition into a first gear mode, where the first gear set 127 is operational, from a second gear mode, where the second gear set 129 is operational, or vice versa. Other modality transitions have also been contemplated such as a modal transition into a forward drive mode from a reverse drive mode or vice versa responsive to driver input received from the input device 172. However, in other examples more automated gear train mode transitions may be implemented. For instance, the controller may automatically place the gear train in the first gear mode or the second gear mode based on vehicle speed and/or load, for example. The controller 152 may also be configured to transition the electric drive axle system 102 into a regenerative mode. In the regenerative mode, energy is extracted from the gear train using the electric motor-generator 106 and transferred to the energy storage device 108. For instance, the electric motor-generator 106 may be placed in a generator mode where at least a portion of the rotational energy transferred from the drive wheels to the generator by way of the gear train is converted into electrical energy. A variety of different modal control strategies have been contemplated.

FIG. 2 shows an electric drive axle system 200. It will be appreciated that the electric drive axle system 200, shown in FIG. 2, serves as an example of the electric drive axle system 102 shown in FIG. 1. As such, at least a portion of the functional and structural features of the electric drive axle system 102 shown in FIG. 1 may be embodied in the electric drive axle system 200 shown in FIG. 2 or vice versa, in certain embodiments.

The electric drive axle system 200 again includes an electric motor-generator 202 and a gear train 204. The electric motor-generator 202 has an electrical interface 206 which is illustrated as a bus bar in FIG. 2. However, other suitable electrical interfaces may be used, in other examples. The electric motor-generator 202 further includes a housing 208. The gear train 204 may include an input shaft 210, an intermediate shaft 212, and an output shaft 214. The input shaft 210 receives rotational input (forward or reverse drive rotation) from the electric motor-generator 202, while the system is operating in forward and reverse drive modes. Different gears in a gear train 204 are coupled to the different shafts, expanded upon in greater detail herein with regard to FIG. 3. Rotational axes 216, 218, and 220 of the input shaft 210, the intermediate shaft 212, and the output shaft 214 are provided for reference in FIG. 2 and FIG. 3. FIG. 2 additionally shows a planetary gear assembly 222 rotationally coupled a differential 224 in the gear train 204. The power paths through the gear train 204 are discussed in greater detail herein. It will be appreciated that placing the planetary gear assembly 222 next to the differential 224 allows less torque to be carried through the gear train 204, enabling the drive train to have fewer and/or smaller components, if wanted.

The planetary gear assembly 222 can achieve a targeted gear ratio (e.g., a relatively high gear ratio, such as a ratio greater than 20:1, in one use-case) in a compact arrangement relative to non-planetary gear arrangements. Thus, the planetary gear assembly can achieve a desired gear ratio with fewer components (e.g., gears and shafts) than non-planetary gear assemblies, if desired. Furthermore, in embodiments where the planetary gear assembly exhibits a relatively high torque output, the planetary gear assembly 222 can attain a more compact packaging due to the load sharing between the planet gears, if desired. Axis system 250 is illustrated in FIG. 2 as well as FIG. 3, when appropriate, for reference. The z-axis may be a vertical axis, the x-axis may be a lateral axis, and/or the y-axis may be a longitudinal axis, in one example. However, the axes may have other orientations, in other examples.

FIG. 3 shows the electric drive axle system 200 with the electric motor-generator 202, input shaft 210, intermediate shaft 212, output shaft 214, and gear train 204. The gear train 204 may include a first gear 300 coupled to the input shaft 210. As described herein, the descriptor "coupled to" may indicate one component is structurally coupled to or formed with another component. For instance, the first gear 300 may be machined from a flange on the input shaft 210, in one example, or separately manufactured and subsequently mechanically attached (e.g., welded, bolted, press-fit, etc.) to the input shaft 210.

A second gear 302 is coupled to the intermediate shaft 212. A third gear 304 and a fourth gear 306 are also coupled to the intermediate shaft 212. Additionally, a fifth gear 308 and a sixth gear 310 are coupled to the output shaft 214. It will be understood, that during different modes of system operation different sets of gears may be operational. To elaborate, the first gear 300, the second gear 302, the fourth gear 306, and the fifth gear 308 may be included in a first gear set 312. On the other hand, the first gear 300, the second gear 302, the third gear 304, and the sixth gear 310 may be included in a second gear set 314. A park gear 311 may also be included in the gear train 204, in some examples. However, the gear sets may include different gear combinations, in other examples. It will be understood that the first and the second gear sets 312 and 314 have different gear ratios (e.g., the first gear set may have a higher gear ratio than the second). In this way, the gear train may include multiple gear ratios to increase gear train adaptability. Additionally, the gear sets may share a few common gears (i.e., the first and second gears in the illustrated embodiment). Fixing the first ratio (i.e., the first and second gears) in the gear train can allow the accuracy of the gears to be increased, if wanted, thereby reducing noise, vibration, and harshness (NVH) in the axle system. However, embodiments where the gear sets do not include overlapping gears have been envisioned. Clutches are included in the gear train 204 to enable the first gear set 312 and the second gear set 314 to be coupled/decoupled to/from the output shaft 214. In this way, the different gear sets may be operationally selected to, for example, more aptly suit the driving environment and/or increase electric motor efficiency.

The planetary gear assembly 222 is shown in FIG. 3 rotationally coupled to the output shaft 214. FIG. 3 additionally illustrates the differential 224 in the gear train 204 rotationally coupled to the planetary gear assembly 222. However, other gear layouts may be used in other examples, such as non-planetary gear assemblies, gear trains with gears positioned between the planetary assembly and the differential, etc. It will be appreciated that in some embodiments, the gear ratio corresponding to the planetary gear assembly 222 may be greater than the gear ratio corresponding to the first gear set 312 or the second gear set 314. The planetary gear assembly 222 allows a desired gear ratio to be realized in a compact arrangement. For instance, the planetary gear assembly 222 may achieve a relatively high gear ratio and space efficiency, if desired. However, non-planetary gear arrangements may be used, in other examples. Furthermore, the planetary gear assembly 222 and the differential 224 are shown positioned on a lateral side 322 of a housing 208 the electric motor-generator 202. A lateral axis 324 of the motor-generator is provided for reference. Offsetting the output shaft 214 and the intermediate shaft 212 from the input shaft 210 allows the planetary gear assembly 222 to be positioned on the side 322 of the motor-generator. It will be appreciated that the planetary gear assembly may be located adjacent to the motor's lateral side 322 due to the planetary gear assembly's ability to be integrated into the gear train without a mating gear parallel thereto, if wanted. In this way, the planetary gear assembly may be placed in a space which has remained unused in certain electrified gearboxes. Thus, positioning the planetary gear assembly on the side of the motor allows the compactness of the axle system to be increased. As a result, the packaging constraints arising during axle installation in the vehicle may pose less of an issue. However, in other examples, the planetary gear assembly 222 may be positioned in other suitable locations. For instance, the planetary gear assembly may be coupled to a section of the output shaft extending away from the motor-generator.

Dashed box 307 illustrates a first carrier (herein, first carrier 307) of the second gear 302, the third gear 304, and the fourth gear 306. The first carrier 307 is sized based on a largest gear of the second gear 302, the third gear 304, and the fourth gear 306. In one example, the first carrier 307 is sized based on the third gear 304. A first baffle 307A is illustrated around the fourth gear 306. As illustrated, the first baffle 307A occupies spaces between the fourth gear 306 and the first carrier 307. The first baffle 307A circumferentially surrounds the fourth gear 306, wherein the first baffle 307A may comprise features for enhancing lubricant flow to the fourth gear 306 while decreasing an amount of lubricant present in the space between the fourth gear 306 and the first carrier 307. A second baffle 309A is illustrated around the sixth gear 310. As illustrated, the second baffle 309A occupies spaces between the sixth gear 310 and the second carrier 309. The second baffle 309A circumferentially surrounds the sixth gear 310, wherein the second baffle 309A may comprise features for enhancing lubricant flow to the sixth gear 310 while decreasing an amount of lubricant present in the space between the sixth gear 310 and the second carrier 309.

Dashed box 309 illustrates a second carrier (herein, second carrier 309) of the fifth gear 308 and the sixth gear 310. The second carrier 309 is sized based on the larger of the fifth gear 308 and the sixth gear 310. In one example, the second carrier 309 is sized based on the fifth gear 308. By sizing the first and second carriers based on a largest gear, there may be empty spaces between smaller gears and their respective carrier, which may be filled by air and more lubricant. However, more lubricant may result in churning losses and lower efficiency. FIG. 4 illustrates an example of a multiple ratio gear system comprising baffles unique to each of the gears to fill the empty space and/or excess space.

Turning now to FIG. 4, it shows an embodiment 400 of a gear box 402 comprising multiple ratios including a first gear ratio 410 comprising a first gear 412 and a first pinion 414. The gear box 402 further comprises a second gear ratio 420 comprising a second gear 422 and a second pinion 424. The gear box 402 further comprises a third gear ratio 430 comprising a third gear 432 and a third pinion 434. Each of the first gear 412, the second gear 422, and the third gear 432 is packaging within a gear carrier 404. Each of the first pinion 414, the second pinion 424, and the third pinion 434 is packaged within a pinion carrier 406.

As is known to those of ordinary skill in the art, a gear ratio is a ratio of a number of rotations of a driver gear to a number of rotations of a driven gear. Additionally or alternatively, the ratio may be based on an output speed relative to an input speed, a number of teeth of the input and output gears, and the like. As such, the first gear ratio 410 is based on a number of rotations of the first gear 412 relative to a number of rotations of the first pinion 414. Similarly, the second gear ratio 420 is based on a number of rotations of the second gear 422 relative to a number of rotations of the second pinion 424. The third gear ratio 430 is based on a number of rotations of the third gear 432 relative to a number of rotations of the third pinion 434. Due to variances in the sizes of the first through third gears and pinions, the values of each of the first, second, and third gear ratios may all be different.

The gear box 402 may be a non-limiting example of a gear box included in the embodiments of an electric drive axle of FIGS. 1-3. In one example, the gear carrier 404 is a non-limiting example of the second carrier 309 and the pinion carrier 406 is a non-limiting example of the first carrier 307 of FIG. 3. In one example, the first gear 412 is a non-limiting example of the fifth gear 308 of FIG. 3, the second gear 422 is a non-limiting example of the sixth gear 310 of FIG. 3. As such, the second gear baffle 428A may be a non-limiting example of the second baffle 309A. In one example, the first pinion 414 is a non-limiting example of the fourth gear 306, the second pinion 424 is a non-limiting example of the third gear 304, and the third pinion 434 is a non-limiting example of the second gear 302. In one example, the first pinion baffle 418 is a non-limiting example of the first baffle 307A.

In the example of FIG. 4, there is a plurality of the gear carrier 404 and the pinion carrier 406, wherein each gear ratio of the plurality of gear ratios comprises one of each of the gear carrier 404 and the pinion carrier 406. The gear carrier 404 is sized based on a largest gear in the gear box 402. Similarly, the pinion carrier 406 is sized based on a largest pinion in the gear box 402. In the example of the FIG. 4, the largest gear is the first gear 412 and the largest pinion is the third pinion 434. As such, a space between the first gear 412 and the gear carrier 404 is small (e.g., zero). Similarly, a space between the third pinion 434 and the pinion carrier 406 is small (e.g., zero).

The gears and pinions may be arranged such that a gear central distance is measured from a central axis 490 to an outer gear axis 492 is fixed for each of the first gear 412, the second gear 422, and the third gear 432. In one example, the central axis 490 represents a common axle on which each of the gears may be arranged. A pinion central distance is measured from a central axis 494 to an outer pinion axis 496. In one example, the gear central distance corresponds to a radius of the gear carrier 404 and the pinion central distance corresponds to a radius of the pinion carrier 406. Due to variations of the sizes of the gears and pinions, there may be spaces and/or gaps between an outer diameter of the gear or the pinion and a corresponding carrier.

A first pinion baffle 418 is arranged around the first pinion 414. The first pinion baffle 418 may comprise a donut shape and function as a spacer, differently shaped to the first pinion 414. The first pinion baffle 418 may be configured to reduce a size of a space between the first pinion 414 and the pinion carrier 406. In one example, the first pinion baffle 418 eliminates the space between the first pinion 414 and the pinion carrier 406.

A second gear baffle 428A is arranged around the second gear 422. The second gear baffle 428A may comprise a donut shape and function as a spacer, differently shaped to the second gear 422. The second gear baffle 428A may be configured to reduce a size of a space between the second gear 422 and the carrier 404 In one example, the second gear baffle 428A eliminates the space between the second gear 422 and the gear carrier 404.

A second pinion baffle 428B is arranged around the second pinon 424. The second pinion baffle 428B may comprise a donut shape and function as a spacer unique to the second pinon 424. The second pinion baffle 428B may be configured to reduce a size of a space between the second pinion 424 and the pinion carrier 406. In one example, the second pinion baffle 428B eliminates the space between the second pinion 424 and the pinion carrier 406.

A third gear baffle 438 is arranged around the third gear 432. The third gear baffle 438 may comprise a donut shape and function as a spacer unique to the third gear 432. The third gear baffle 438 may be configured to reduce a size of a space between the third gear 432 and the carrier 404. In one example, the third gear baffle 438 eliminates the space between the third gear 432 and the gear carrier 404.

As illustrated, the first gear 412 is larger than the second gear 422, which is larger than the third gear 432. As such, the second gear baffle 428A comprises a smaller thickness than the third gear baffle 438 due to there being less space between the gear carrier 404 and the second gear 422.

In one example, each of the baffles included in the gear box 402 comprise a donut shape unique to each of the components such that each baffle may circumferentially surround one of a gear or a pinion. As illustrated, the first gear 412 (e.g., the largest gear) and the third pinion 434 (e.g., the largest pinion) are free of baffles due to the absence of space between them and their corresponding carriers.

Each baffle may be hollow and comprise a molded composite with a slip fit and anti-rotation features relative to a corresponding carrier. Additionally or alternatively, each baffle may be solid and/or metallic. In one example, such as the example of FIGS. 2 and 3, only one of the gear reductions comprises multiple ratios (e.g., gears on the intermediate shaft 218 of FIG. 3) which may demand baffles, while a two-speed shifting gear reduction (e.g., gears on the output shaft 220 of FIG. 2) may be free of baffles. In one example, the baffles are arranged on only one gear reduction or on multiple gear reductions. The baffles may be stationary. However, in some examples, additionally or alternatively, the baffles may be configured to float within a desired tolerance. The baffles may be smooth in some examples or comprise lubrication features such as grooves or holes in other examples.

Turning now to FIG. 5A, it shows a face-on view 500 of an example baffle 510. In one example, the baffle 510 of FIG. 5A may be used identically to the second pinion baffle 428B of FIG. 4. FIG. 5B shows a side-on view 501 of the baffle 510. FIG. 5C shows a top-down cut-out view 502 of the baffle 510.

The baffle 510 comprises an opening 512. The opening 512 may be configured to provide a clearance for a mating gear or pinion. The baffle 510 further comprises a lubricant passage 520 comprising a lubricant inlet 522. The lubricant passage 520 further comprises a lubricant outlet 524. In FIG. 5B a general area of the lubricant inlet 522 and the lubricant outlet 524 are labeled. As such, lubricant may traverse a height of the baffle 510 or a portion thereof. The lubricant passage 520 may be a groove, slot, bore, or the like shaped into a body of the baffle 510.

The baffle 510 further comprises at least one anti-rotation and locating feature 530. In the examples of FIGS. 5A-5C, the baffle 510 comprises at least two anti-rotation and locating features 530. The locating and/or anti-rotation features 530 may be integrated into the design in any shape or be a secondary piece (such as a bolt, etc.). The anti-rotation and locating features 530 may be conical, rectangular, triangular, square, or other shapes without departing from the scope of the present disclosure.

The baffle 510 may be configured such that it does not fully surround the gear, and due to the gear mesh to a mating gear, the baffle 510 may be blocked from being 360 degrees around the gear. In one example, the baffle 510 surrounds up to 330 degrees of a gear. In one example, the baffle 510 surrounds between 200 to 330 degrees of a gear. For example, the baffle 510 may only surround 234 degrees or 321 degrees of the gear. The baffle 510 may comprise a plurality of materials though some type of molded composite (plastic) may be a cost-effective and durable option. The cross-section of the baffle can be round, rectangular, rectangular with rounded corners, or almost any more complex shape.

Turning to FIGS. 5D, 5E, and 5F, they show various views of a pinion baffle 560 integrated with the gear baffle 510. FIG. 5D illustrates a face-on view 550. FIG. 5E illustrates a side-on view 551 of the pinion baffle 560 integrated with the gear baffle 510. FIG. 5F illustrates a top-down cut-out view 552 of the pinion baffle 560 integrated with the gear baffle 510. In one example, the pinion baffle 560 may be used similarly to the pinion baffle 428A of FIG. 4B such that the embodiments illustrated in FIG. 5D-5F are identical to the embodiment of FIG. 4B.

In one example, the pinion baffle 560 and the gear baffle 510 are integrally formed as a single, continuous piece. In some examples, the pinion baffle 560 and the gear baffle 510 may be formed as separate pieces wherein a coupling element such as a fastener, an adhesive, a fusion, or other similar element may be used to physically couple the two.

FIGS. 1-5F show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In this way, manufacture of the gear carrier or the pinion carrier may be based on a largest gear or a largest pinion while churning losses may be mitigated via inclusion of a plurality of differently shaped baffles. The technical effect of the plurality of differently shaped baffles is to occupy a space between a pinion or a gear and its corresponding carrier. The baffles are customized to shapes and sizes of the various gears and pinions while optionally comprising lubricant flow enhancing features to maintain lubricant flow.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric drive axle system, comprising:
   a gear box comprising a fixed center distance measured from a first carrier to an axle on which a plurality of pinions are arranged and a second fixed center distance measured from a second carrier to a second axle on which a plurality of gears are arranged;
   a plurality of gear baffles, each of the plurality of gear baffles arranged at least partially around a gear of the plurality of gears and configured to reduce a size of a space between the gear and the second carrier, wherein each gear baffle of the plurality of gear baffles is differently sized; and
   a plurality of pinion baffles, each of the plurality of pinion baffles arranged at least partially around a pinion of the plurality of pinions and configured to reduce a size of a space between the pinion and the first carrier, wherein each pinion baffle of the plurality of pinion baffles is differently sized, and wherein a largest gear of the plurality of gears and a largest pinion of the plurality of pinions do not comprise a baffle.

2. The electric drive axle system of claim 1, wherein each pinion of the plurality of pinions is differently sized.

3. The electric drive axle system of claim 1, wherein each gear of the plurality of gears is differently sized.

4. The electric drive axle system of claim 1, further comprising a plurality of gear ratios, including a first gear ratio based on a first gear of the plurality of gears and a first pinion of the plurality of pinions, a second gear ratio based on a second gear of the plurality of gears and a second pinion of the plurality of pinions, and a third gear ratio based on a third gear of the plurality of gears and a third pinion of the plurality of pinions, wherein the first gear is larger than the second gear, which is larger than the third gear, and wherein the first pinion is smaller than the second pinion, which is smaller than the third pinion.

5. The electric drive axle system of claim 4, wherein only the second gear ratio comprises a gear baffle and a pinion baffle.

6. The electric drive axle system of claim 1, wherein one or more of the plurality of pinion baffles comprises grooves or holes.

7. The electric drive axle system of claim 1, wherein a generator is coupled to the first carrier, and wherein the second carrier is coupled to a differential via a planetary gear assembly.

8. An electric drive axle system, comprising:
   a gear box comprising a plurality of gear ratios, each gear ratio comprising a gear and a pinion, wherein each gear ratio comprises a baffle,
   wherein the plurality of gear ratios comprises a first gear ratio, a second gear ratio, and a third gear ratio, wherein a first gear of the first gear ratio is larger than a second gear of the second gear ratio which is larger than a third gear of the third gear ratio, and wherein each gear of the plurality of gear ratios, except for a largest gear, comprises a baffle.

9. The electric drive axle system of claim 8, further comprising where a gear ratio of the plurality of gear ratios comprises two baffles including a gear baffle arranged around the gear, and the baffle, wherein the baffle is a pinion baffle arranged around the pinion.

10. The electric drive axle system of claim 9, wherein the pinion baffle is integrally arranged with the gear baffle.

11. The electric drive axle system of claim 8, wherein a first pinion of the first gear ratio is smaller than a second pinion of the second gear ratio which is smaller than a third pinion of the third gear ratio, and wherein each pinion of the plurality of gear ratios, except for a largest pinion, comprises a baffle.

12. The electric drive axle system of claim 8, wherein the baffle is configured to reduce an amount of space between a gear carrier and the gear or an amount of space between a pinion carrier and the pinion.

13. The electric drive axle system of claim 8, wherein the baffle is configured as a spacer and eliminates any space between a gear carrier and the gear or a pinion carrier and the pinion.

14. An electric drive axle system, comprising:
- a gear train configured to rotationally couple to an electric motor-generator, the gear train comprising:
  - a gear carrier comprising a plurality of differently sized gears, wherein the gear carrier is uniformly sized and shaped; and
  - a plurality of differently shaped gear baffles, each of the plurality of gears, except for a largest gear, having a gear baffle of the plurality of differently shaped gear baffles, wherein each of the plurality of differently shaped gear baffles is configured to reduce a space between a gear and the gear carrier.

15. The electric drive axle system of claim 14, further comprising:
- a pinion carrier comprising a plurality of differently sized pinions, wherein the pinion carrier is uniformly sized and shaped; and
- a plurality of differently shaped pinion baffles, each of the plurality of pinions, except for a largest pinion, having a pinion baffle of the plurality of differently shaped pinion baffles, wherein each of the plurality of differently shaped pinion baffles is configured to reduce a space between a pinion and the pinion carrier.

16. The electric drive axle system of claim 15, wherein there is no space between the gear carrier and the largest gear, and wherein there is no space between the pinion carrier and the largest pinion.

17. The electric drive axle system of claim 15, wherein the plurality of differently sized pinions includes a first pinion, a second pinion, and a third pinion, and wherein the plurality of differently sized gears includes a first gear, a second gear and a third gear,
- the first pinion and the first gear having a first gear ratio,
- the second pinion and the second gear having a second gear ratio, and
- the third pinion and the third gear having a third gear ratio.

18. The electric drive axle system of claim 14, wherein a center distance measured from an axle to the gear carrier is fixed.

* * * * *